United States Patent

[11] 3,586,155

[72] Inventors Fred C. Turrentine
Milwaukie;
James K. Wriglesworth, Portland, both of, Oreg.
[21] Appl. No. 819,349
[22] Filed Apr. 25, 1969
[45] Patented June 22, 1971
[73] Assignee Con-Vey International, Inc.
Portland, Oreg.

[54] TUBULAR CONVEYOR WITH SPOOL-SHAPED CONVEYOR FLIGHTS
10 Claims, 11 Drawing Figs.

[52] U.S. Cl. .................................. 198/172, 119/52, 198/69, 198/176
[51] Int. Cl. ........................................... B65g 19/08
[50] Field of Search........................................... 198/130, 168, 172, 176, 65, 69, 206; 119/52

[56] References Cited
UNITED STATES PATENTS
2,335,611 11/1943 Pray .......................... 198/168 X

| | | | |
|---|---|---|---|
| 2,738,765 | 3/1956 | Hart ............................ | 119/52 |
| 2,756,866 | 7/1956 | Wilde, Jr. ..................... | 198/168 |
| 2,762,495 | 9/1956 | Hart ............................ | 198/176 |
| FOREIGN PATENTS | | | |
| 512,893 | 9/1939 | Great Britain................ | 198/176 |

Primary Examiner—Evon C. Blunk
Assistant Examiner—Alfred N. Goodman
Attorney—Lee R. Schermerhorn ABSTRACT: Spool-shaped conveyor flights are pulled through a tube by an endless cable driven by a sprocket wheel. A plurality of sections of cable equipped with drive lugs and coupling lugs is connected together end to end. The spools have interior cavities to contain such lugs, certain spools serving as couplings for connecting together the ends of adjacent sections of cable. The spools are split longitudinally for convenience in mounting on and removal from the cable. This arrangement permits the tube to bend in any direction whereby it is not constrained to a single plane of operation.

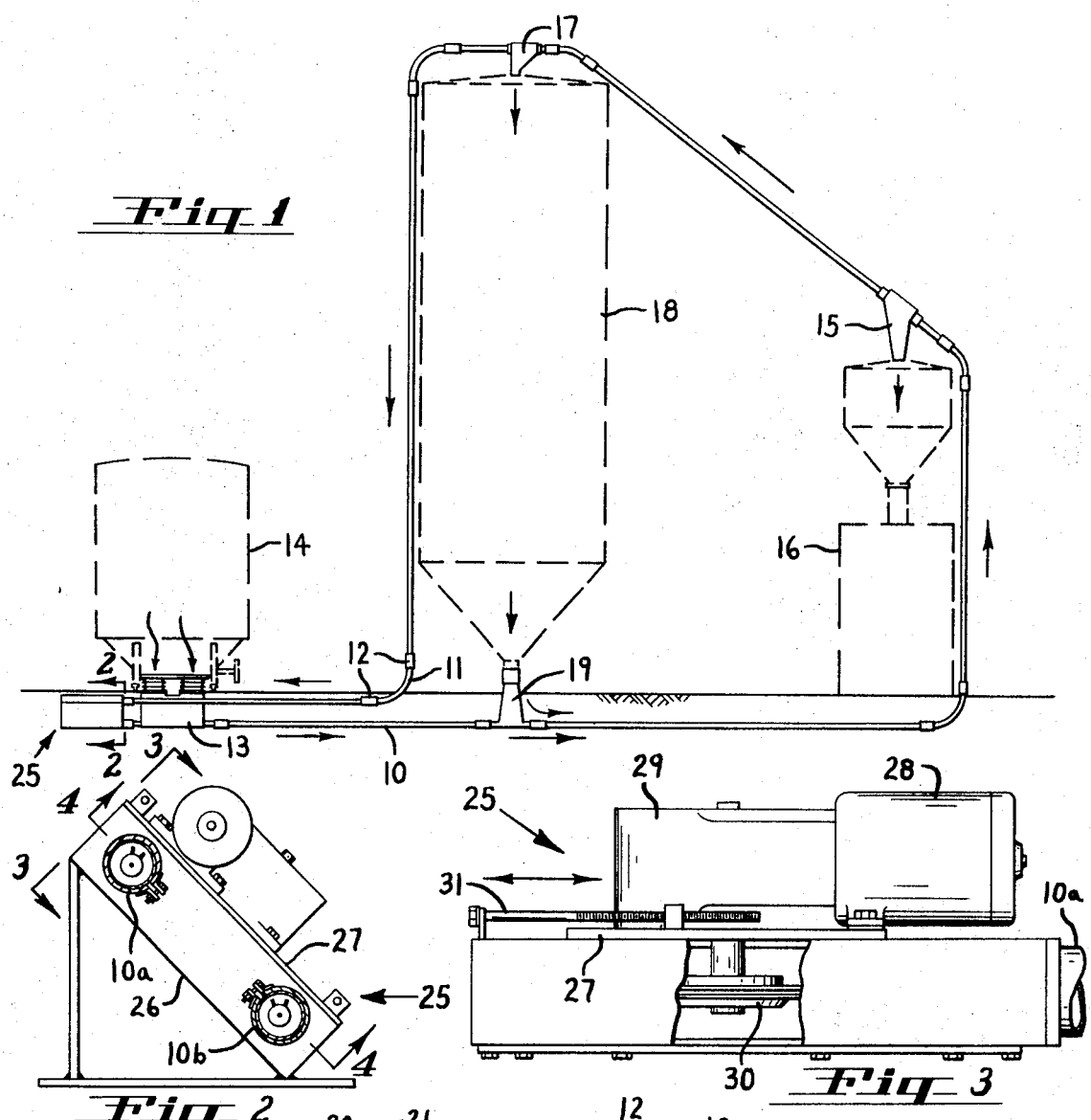
*Fig. 1*
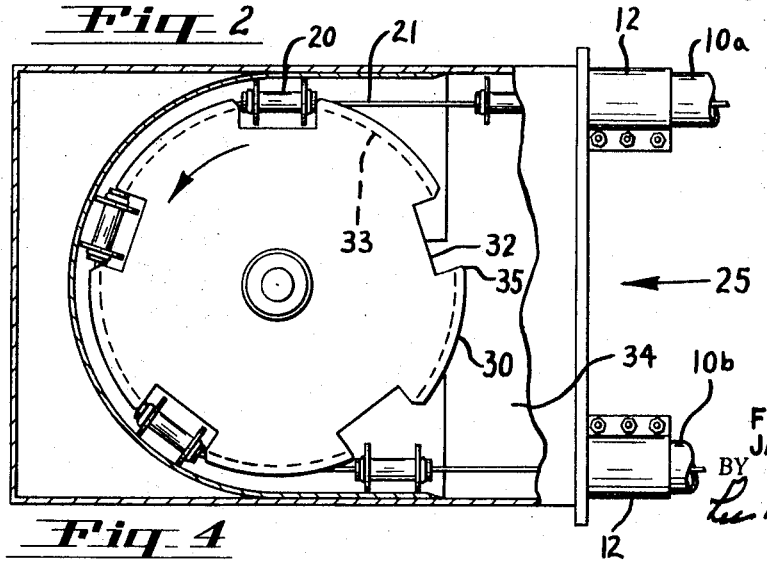
*Fig. 2*
*Fig. 3*
*Fig. 4*
INVENTORS
FRED C. TURRENTINE
JAMES K. WRIGLESWORTH
BY
*Attorney*

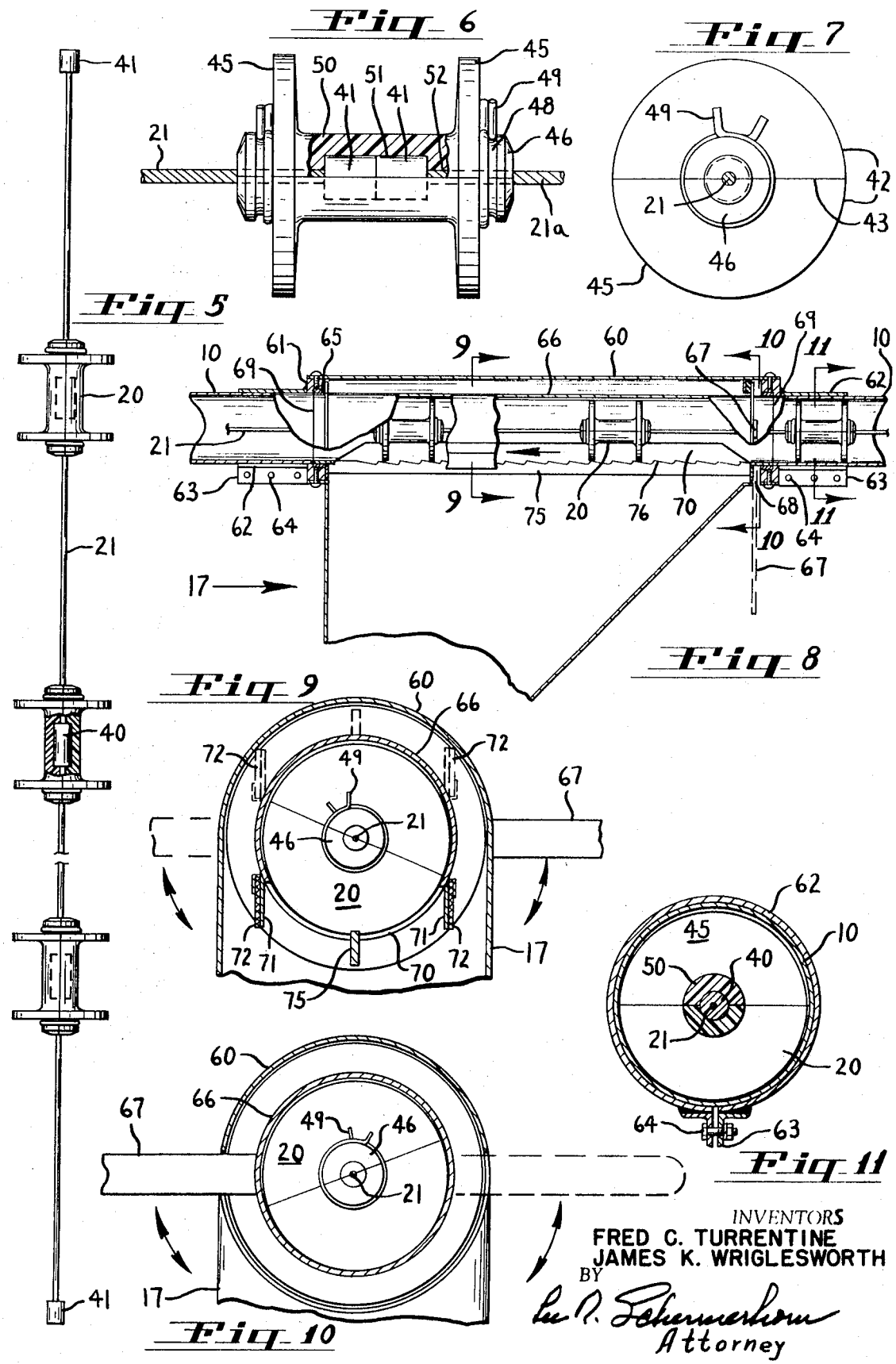

TUBULAR CONVEYOR WITH SPOOL-SHAPED CONVEYOR FLIGHTS

BACKGROUND OF THE INVENTION

This invention relates to a tubular conveyor with spool-shaped conveyor flights mounted on an endless cable.

It is customary in tubular conveyors to provide a sprocket wheel at each angulation point in order to guide the cable and conveyor flights around the angle for smooth operation. Usually, such sprocket wheels merely provide an inactive return reach for the cable, the active part of the conveyor being limited to a single straight line reach, or tangent, between sprocket wheels.

Attempts have been made to pull disc-shaped flights around bends in a tube without sprocket wheels but such devices have not be successful in practice. The bends created excessive sliding friction and the flight discs tended to cant on the cable, causing quick deterioration and breakdown of the apparatus. Repair was costly and time consuming, causing the conveyor to be out of operation for excessive periods of time.

Objects of the present invention are, therefore, to provide an improved conveyor having circular flights for moving fluent material through a tube, to provide a tube conveyor which does not require sprocket wheels at points of angulation, to provide a tube conveyor which will move material through bends in any direction, to provide improved conveyor flights for a tube conveyor, to provide an improved arrangement of drive lugs and coupling lugs on the cable of a tube conveyor, to provide a tube conveyor in which damage may be repaired quickly and without excessive cost and to provide a tube conveyor of relatively simple and inexpensive construction which is rugged and durable and relatively trouble free in operation.

SUMMARY OF THE INVENTION

In the present system, the conveyor flights are made in the shape of spools which slide around bends in the tube smoothly without excessive friction. Each spool is provided with an interior cavity to contain a metal drive lug formed on the cable. The cables are cut in predetermined lengths which may be assembled in different combinations to make any desired total length of cable.

The ends of each length of cable are equipped with coupling lugs having half the length of the drive lugs. Thus, a spool cavity will contain two of the coupling lugs for connecting the cable sections together without any special connectors. The spools are split longitudinally for convenient application and removal and are equipped with a simple form of clamp means to hold the two spool halves together on the cable. The cable is driven by a sprocket wheel having sufficient takeup adjustment to remove slack from the cable.

The invention will be better understood and additional objects and advantages will become apparent from the following description of the preferred embodiment illustrated in the accompanying drawings. Various changes may be made in the details of construction and arrangement of parts and certain features may be used without others, within the spirit of the invention.

BRIEF DESCRIPTION OF THE DRAWINGS

FIG. 1 is a side elevation view showing a tubular conveyor system embodying the principles of the invention;

FIG. 2 is a sectional view on the line 2-2 in FIG. 1;

FIG. 3 is a view on the line 3-3 in FIG. 2, with parts broken away;

FIG. 4 is a sectional view on the line 4-4 in FIG. 2;

FIG. 5 is a view with parts broken away, showing a plurality of conveyor flights mounted on a section of cable;

FIG. 6 is an enlarged side elevation view of one of the conveyor flights, with parts broken away;

FIG. 7 is an end elevation view of the conveyor flight in FIG. 6;

FIG. 8 is a fragmentary side elevation view, with parts broken away. Showing one of the outfeed hoppers in FIG. 1;

FIG. 9 is a sectional view on the line 9-9 in FIG. 8;

FIG. 10 is a sectional view on the line 10-10 in FIG. 8; and

FIG. 11 is a sectional view on the line 11-11 in FIG. 8.

DESCRIPTION OF THE PREFERRED EMBODIMENT

As seen in FIG. 1, the conveyor system comprises a plurality of straight tube sections 10 and a plurality of curved tube sections 11 secured together end to end by coupling sleeves 12 equipped with suitable clamp means. An infeed hopper 13 communicating with the first tubular section 10 received fluent material from a source of supply, such as the hopper bottom railway car 14. An outfeed hopper 15 is arranged to discharge into a container 16 and a second outfeed hopper 17 is arranged to discharge into a storage bin 18. In the present illustration, the storage bin 18 is arranged to discharge into a second infeed hopper 19 for the transfer of material to container 16 from time to time.

The fluent material is moved through tube sections 10 and 11 by a plurality of spool-shaped conveyor flights 20 mounted on a plurality of cable sections 21. The cable and conveyor flights are drawn through the tube sections by the drive unit 25 shown in FIGS. 2, 3 and 4. Drive unit 25 comprises a base housing 26 having a plate 27 mounted for sliding movement on one side thereof. Mounted on plate 27 are a drive motor 28, reduction gear unit 29 and sprocket wheel 30. Plate 27 is adjustable by means of screws 31 to take up slack in the cable 21.

Sprocket wheel 30 is provided with notches 32 to receive the conveyor flights 20 and a groove 33 to receive the cable 21. A bifurcated nose portion 35 on the rear side of each notch 32 engages a spool 20 to apply traction to the cable. Rotation of the sprocket wheel by drive motor 28 pulls the cable and flights in through an entrance tube section 10a and returns the cable and flights through an exit tube section 10b.

Housing 26 may be mounted in a vertical plane or in an inclined position as shown in FIG. 2 so that the entrance tube 10a is on a higher level than exit tube 10b. Then any residual fluent material carried back to the drive unit by the incoming spools will flow by gravity through a space 34 directly to the outgoing spools at the bottom of this space so that the material will be recirculated and will not fall into the sprocket wheel and interfere with its operation.

Referring now to FIGS. 5, 6 and 7, each cable section 21 has a cylindrical metal drive lug 40 cast thereon at one foot intervals and each end of the cable is similarly equipped with a cylindrical coupling lug 41 which is half the length of the drive lugs. Each spool 20 is preferably made of a suitable plastic such as nylon which has good wear-resistant qualities and a low coefficient of friction.

The spool is molded in two identical halves 42 which mate together in a longitudinal diametral plane 43. Each half 42 has a semicircular end flange 45 which forms a circular flange on the assembled spool. Each half 42 is also equipped with half of a circular end boss 46 on each end of the spool. The boss on the rear end of each spool is engaged by nose portion 35 on drive sprocket 30 to pull the cable through the system. The side of each boss is provided with a circular groove 48 to receive a constrictive wire spring clamp 49 for clamping the halves 42 together at their diametral mating plane 43.

Each spool half 42 has a central barrel portion 50 interconnecting the two flange portions 45, which barrel portion contains a semicylindrical cavity 51. When the two spool halves 42 are assembled, they enclose a cylindrical cavity 51 having the same length and diameter as drive lugs 40. The end portions of each spool half are provided with a semicylindrical recess 52 which forms part of a cylindrical bore in the assembled spool to receive cable 21.

Spool halves 42 are assembled on each drive lug 40 intermediate the ends of each cable section, as seen in FIG. 5. The ends of adjacent cable sections are connected together by assembling two spool halves 42 on the coupling lugs 41 of two adjacent cable sections as indicated at 21 and 21a in FIG. 6. The spools 20 are all identical and any spool may serve as a cable connector.

A conventional single disc conveyor flight encounters resistance to travel through a tube by reason of sliding friction and the force required to move a quantity of fluent material along the tube. Both of these retarding forces act almost exclusively on the lower half of the disc, causing the top of the disc to cant forward creating high stresses in the disc and draft cable which result in frequent break downs. This condition becomes critical in bends in the tube, making the device utterly impractical without sprocket wheels to support the cable around the bends.

In the present spool-shaped flight, the rear disc flange 45 stabilizes the front disc flange 45 so that the front flange does not cant and subject the parts to high stresses. This greatly reduces normal wear and tear and extends the life of the cable and flights to provide trouble-free operation for long periods of time. The spools provide adequate support for the cable around even relatively short radius bends without any need for idler sprockets.

Cable sections 21 are preferably made in 1-foot, 3-foot, 5-foot and 10-foot lengths. By connecting such sections together in different combinations, a cable loop of any length may be formed within 1 foot of 2 desired dimension. Takeup adjustment screws 31 in FIG. 3 have sufficient range of travel to accommodate such length variations. If the cable should stretch beyond the range of adjustment of screws 31, a 1-foot section may be removed, a 3-foot section may be replaced by a 1-foot section or a 5-foot section may be replaced by a 3-foot section.

It is never necessary to make a cable of a certain length to fit the requirements of a particular conveyor installation. The designated cable lengths just mentioned may be used for all installations. In case of damage to a spool, only the damaged spool is replaced. The clamp-type couplings 12 provide easy access to a considerable number of points in the conveyor line when repair is necessary.

FIGS. 8 to 11 illustrate the construction of outfeed hopper 17. Hopper 17 has an arcuate top wall 60 connected at its ends with ring members 61 on split ring clamp sleeves 62 similar to coupling sleeves 12. These clamp sleeves have ears 63 to receive bolts 64 for clamping on the ends of tube sections 10 whereby the hopper 17 is interposed between the ends of two tube sections. Each ring member 61 also contains a bearing 65 to support one end of a valve tube 66 for rotation. Valve tube 66 may be rotated 180° by a handle 67 which extends through an arcuate slot 68 in the wall of the hopper. Tube 66 has the same diameter as tubes 10 and has ends 69 which abut the ends of the tubes 10. Thus, the spools 20 pass freely through the tube 66 as shown.

One side of tube 66 is cut away to provide a discharge opening 70. When opening 70 is turned downward, the conveyor discharges into hopper 17 and when opening 70 is turned upward, the fluent material is moved by conveyor flights 20 through tube 66 without discharging into hopper 17. A pair of longitudinal lips 71 on opposite sides of opening 70 are equipped with flexible seals 72 which engage arcuate wall 60 when opening 70 is turned upward, as shown in broken lines in FIG. 9, to prevent discharge of the material.

A guide bar 75 spans the length of the opening 70 to support the conveyor flights 20 in the opening. This guide bar is mounted at its ends in the tube 66. When the fluent material being conveyed is of a fine texture, it may tend to adhere to the conveyor flights 20 and not discharge freely through the opening 70. In such cases, the guide bar 75 is provided with a serrated upper edge 76 to vibrate the conveyor flights as they move along the bar and shake the fluent material into the hopper. When the fluent material is of a character that does not adhere to the conveyor flights, the bar 75 has a straight and smooth upper edge.

When valve handle 67 is in a position where it is not readily accessible, it may be rotated by means of a pull chain or other suitable mechanical device. Tube 66 may also be rotated by a motor drive means under remote control when desired. In the particular conveyor system illustrated in FIG. 1, it would not be necessary to close the valve in outfeed hopper 17 because that is the last discharge point in the conveyor line. However, outfeed hopper 15 is equipped with a similar valve 66 which would be opened to fill the container 16 and closed to discharge the fluent material into storage bin 18.

Thus, the contents of railroad car 14 may be conveyed selectively to container 16 or storage bin 18. Then, by opening a valve in the bottom of storage bin 18, some of its contents may be transfered to container 16 from time to time. The system, of course, may be extended to include any number of containers and storage bins and material may be transferred from any one to another. The system is not limited to conveyance in a single plane as the bends 11 may turn in any desired direction.

Having now described our invention and in what manner the same may be used, what we claim as new and desire to protect by Letters Patent is:

1. A conveyor comprising a series of tube sections, a cable having conveyor flights thereon for travel through said tube sections, each flight having a spool shape with opposite circular end flanges to stabilize the flight in moving fluent material through the tube sections, a plurality of drive lugs formed on said cable at intervals therealong, said drive lugs having driving engagement with said flights, an outfeed hopper connected between two of said tube sections, a rotary valve in said hopper coaxial with said tube sections, said valve comprising a tube having a discharge opening in one side thereof, means to rotate said valve tube, and a guide bar spanning the length of said discharge opening to support said spools in said opening, said guide bar having a serrated edge engaging said spools to vibrate the spools.

2. A conveyor as defined in claim 1, said hopper having an arcuate top wall spaced above said valve tube, and longitudinal seals on said valve tube on opposite sides of said discharge opening engaging said top wall when said discharge opening is rotated upward.

3. A conveyor comprising a tube, a cable in said tube having conveyor flights thereon for moving fluent material through the tube, said tube having a discharge opening in one side thereof, and a guide bar spanning the length of said discharge opening to support said flights in said opening, said guide bar having a serrated edge engaging said flights to vibrate the flights as they move along the guide bar.

4. A conveyor comprising a tube having bends therein, conveyor flights in said tube slidable around said bends to move fluent material through the tube, each flight comprising a pair of spool halves mated together in a longitudinal, diametral joint, a cable extending through a plurality of said flights, means securing said flights to said cable including clamp means holding said two spool halves together on the cable, a pair of drive bosses on each flight concentric with said cable protruding axially from opposite ends of the spool-shaped flight, and a drive sprocket for said cable having nose portions engaging said bosses.

5. A conveyor as defined in claim 4 including a pair of opposed recesses in the mating sides of said spool halves forming an axial cavity in each of said flights, and drive lugs at intervals on said cable contained in said cavities.

6. A conveyor as defined in claim 5, including a coupling lug on each end of said cable, each coupling lug having half the length of a drive lug whereby said cavity will receive two coupling lugs end to end for connecting two cable ends together.

7. A conveyor as defined in claim 5, each of said spool halves comprising a molding.

8. A conveyor as defined in claim 7, said spool halves being molded of a plastic material.

9. A conveyor as defined in claim 8, said clamp means comprising circumferential constrictive clamps.

10. A conveyor as defined in claim 9, said clamps being applied to said bosses.